US009515726B2

(12) United States Patent
Adam et al.

(10) Patent No.: US 9,515,726 B2
(45) Date of Patent: Dec. 6, 2016

(54) PROVIDING CHANNEL HEALTH FOR A WDM SYSTEM

(71) Applicant: AFL Telecommunications LLC, Duncan, SC (US)

(72) Inventors: Sean Patrick Adam, Wrentham, MA (US); Joseph Fitzgerald, Concord, NH (US); Jeffrey Alexander Harding, Meredith, NH (US); Scott Prescott, Belmont, NH (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

(21) Appl. No.: 14/359,637

(22) PCT Filed: Oct. 4, 2013

(86) PCT No.: PCT/US2013/063497
§ 371 (c)(1),
(2) Date: May 21, 2014

(87) PCT Pub. No.: WO2014/055889
PCT Pub. Date: Apr. 10, 2014

(65) Prior Publication Data
US 2015/0215037 A1    Jul. 30, 2015

Related U.S. Application Data

(60) Provisional application No. 61/709,367, filed on Oct. 4, 2012.

(51) Int. Cl.
*H04J 14/02* (2006.01)
*H04B 10/079* (2013.01)
*H04Q 11/00* (2006.01)

(52) U.S. Cl.
CPC .. *H04B 10/07953* (2013.01); *H04B 10/07955* (2013.01); *H04B 10/07957* (2013.01);
(Continued)

(58) Field of Classification Search
USPC ............................................... 398/20, 26, 34
See application file for complete search history.

(56) References Cited

U.S. PATENT DOCUMENTS 6,975,395 B1 * 12/2005 Gentieu ..................... G01J 3/02
356/326
2003/0151801 A1 * 8/2003 Jayaram ............... H04B 10/077
359/341.1
(Continued)

FOREIGN PATENT DOCUMENTS

EP      1685663 A2    8/2006

OTHER PUBLICATIONS

International Search Report of PCT/US2013/063497 dated Feb. 27, 2014.
(Continued)

*Primary Examiner* — David Payne
*Assistant Examiner* — Omar S Ismail
(74) *Attorney, Agent, or Firm* — Dority & Manning, P.A

(57) ABSTRACT

The present disclosure describes a method, an apparatus, and a non-transitory computer-readable medium storing a program for measuring characteristics of a WDM system. The method may include obtaining channel characteristics of a channel, calculating a Health Factor of a channel using the characteristics, and displaying the Health Factor and characteristics of a channel on a display device.

22 Claims, 14 Drawing Sheets

(52) U.S. Cl.
CPC .......... *H04J14/02* (2013.01); *H04Q 11/0067* (2013.01); *H04J 14/0227* (2013.01); *H04Q 2011/0083* (2013.01)

(56) References Cited

U.S. PATENT DOCUMENTS

| | | | |
|---|---|---|---|
| 2003/0152385 A1 | 8/2003 | Eldada et al. | |
| 2003/0161630 A1* | 8/2003 | Jayaram | H04B 10/077 398/9 |
| 2005/0078957 A1 | 4/2005 | Hendow | |
| 2005/0085186 A1* | 4/2005 | Sandrin | H04B 7/18513 455/12.1 |
| 2010/0266275 A1* | 10/2010 | Xia | H04B 10/0773 398/16 |
| 2013/0028597 A1* | 1/2013 | Ye | H04B 10/07953 398/26 |

OTHER PUBLICATIONS

AFL Telecommunications LLC, European Patent Application No. 13844135.7; Extended European Search Report; dated Apr. 15, 2016; (2 pages).

\* cited by examiner

FIG. 2A

| Power | Frequency-Shift | OSNR | Health |
|---|---|---|---|
| >-Power-Marginal-Threshold | <-Frequency-Shift Marginal-Threshold | >-OSNR-Marginal-Threshold | Good |
| =-Power-Marginal-Threshold | =-Frequency-Shift-Marginal-Threshold | =-OSNR-Marginal-Threshold | Good |
| =-Power-Marginal-Threshold | <-Frequency-Shift Marginal-Threshold | >-OSNR-Marginal-Threshold | Good |
| >-Power-Marginal-Threshold | <-Frequency-Shift Marginal-Threshold | >-OSNR-Marginal-Threshold | Good |
| >-Power Marginal-Threshold | =-Frequency-Shift Marginal-Threshold | =-OSNR-Marginal-Threshold | Good |
| <-Power-Fail-Threshold | >-Frequency-Shift Fail-Threshold | <-OSNR-Fail-Threshold | Bad |
| <-Power-Fail-Threshold | =-Frequency-Shift Marginal-Threshold | =-OSNR-Marginal-Threshold | Bad |
| =-Power-Marginal-Threshold | >-Frequency-Shift Fail-Threshold | =-OSNR-Marginal-Threshold | Bad |
| =-Power-Marginal-Threshold | =-Frequency-Shift Marginal-Threshold | <OSNR-Fail-Threshold | Bad |
| <-Power-Fail-Threshold | >-Frequency-Shift Fail-Threshold | =-OSNR-Marginal-Threshold | Bad |
| =-Power-Marginal-Threshold | >-Frequency-Shift Fail-Threshold | <-OSNR-Fail-Threshold | Bad |
| <-Power-Fail-Threshold | =-Frequency-Shift Marginal-Threshold | <-OSNR-Fail-Threshold | Bad |

FIG. 2B

| Power | Frequency-Shift | OSNR | Health |
|---|---|---|---|
| >-Power-Fail-Threshold | <-Frequency-Shift-Marginal-Threshold | >-OSNR-Marginal-Threshold | Bad |
| >-Power-Marginal-Threshold | >-Frequency-Shift-Fail-Threshold | >-OSNR-Marginal-Threshold | Bad |
| >-Power-Marginal-Threshold | <-Frequency-Shift-Marginal-Threshold | <-OSNR-Fail-Threshold | Bad |
| <-Power-Fail-Threshold | >-Frequency-Shift-Fail-Threshold | >-OSNR-Marginal-Threshold | Bad |
| >-Power-Marginal-Threshold | >-Frequency-Shift-Fail-Threshold | >-OSNR-Fail-Threshold | Bad |
| <-Power-Fail-Threshold | <-Frequency-Shift-Marginal-Threshold | >-OSNR-Fail-Threshold | Bad |
| =-Power-Fail-Threshold | =-Frequency-Shift-Fail-Threshold | =-OSNR-Marginal-Threshold | Bad |
| =-Power-Fail-Threshold | <-Frequency-Shift-Marginal-Threshold | >-OSNR-Marginal-Threshold | Marginal |
| >-Power-Marginal-Threshold+-3 | =-Frequency-Shift-Fail-Threshold | >-OSNR-Marginal-Threshold | Marginal |
| >-Power-Fail-Threshold | <-Frequency-Shift-Marginal-Threshold | =-OSNR-Fail-Threshold | Marginal |
| =-Power-Fail-Threshold | <-Frequency-Shift-Marginal-Threshold | =-OSNR-Fail-Threshold | Marginal |
| =-Power-Marginal-Threshold+-3 | =-Frequency-Shift-Fail-Threshold | =-OSNR-Marginal-Threshold | Marginal |
| =-Power-Fail-Threshold-+-3 | =-Frequency-Shift-Fail-Threshold | >-OSNR-Marginal-Threshold | Marginal |
| =-Power-Fail-Threshold-+-3 | =-Frequency-Shift-Fail-Threshold | =-OSNR-Fail-Threshold | Marginal |

FIG. 9

| WDM900 - Options | | | | |
|---|---|---|---|---|
| ⓘ Information | ⇧ Graph | ♡ Health | ⊙ Display | ⚙ System |
| Model | WDM900 | | | |
| Serial Number | 2B255F004 | | | |
| Calibration Date | 8/12/2013 | | | |
| Application Version | 0.19.0.0 | | | |
| OS Version | 3.4.3.728 | | | |
| OS Build Date | 7/17/2013 2:40:00PM | | | |
| Power Interface Version | 0.0.1.6 | | | |
| Power Manager Version | 0.2.7 | | | |
| Copyright | Copyright© 2012 AFL | | | |
| Technical Support | NOYTechsupport @ AFLdobal.com<br>1+800-321-5298 | | | |
| Patents | Patent Pending | | | |

Reset to Defaults     Calibrate Screen

PROVIDING CHANNEL HEALTH FOR A WDM SYSTEM

CROSS-REFERENCE TO RELATED APPLICATIONS

This application is based upon and claims the benefit of priority from U.S. Provisional Application No. 61/709,367, filed Oct. 4, 2012, in the United States Patent and Trademark Office, the disclosures of which are incorporated herein in its entirety by reference.

BACKGROUND

1. Field

The disclosure is related to a method of and device for providing channel health of a channel in a wavelength divisional multiplex system.

2. Related Art

The background information provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

As network carriers look to provide greater amounts of capacity, they must find ways to provide greater bandwidth in their existing systems. Wavelength Division Multiplexing multiplexes different wavelengths of light onto a single fiber to transmit data in defined channels. To get increasing amounts of data through the fiber, data rates are increasing from 10 G to 40 G to 100 G or higher and channel spacing is compressing from 200 GHz to 100 GHz to 50 GHz and lower.

This ever increasing data greatly increases the burden on the integrity of the distribution system, which includes the fiber and the components. To determine if a network is able to support the data transmission without corruption, carriers must be able to test their system and determine quickly if the performance is sufficient to reliably transmit data.

There are many different characteristics which define the performance of a given network. Carriers must have skilled test personnel capable of not only performing the measurements but also analyzing the different characteristics and determine if the network is capable of reliably transmitting data.

This drives up cost of test by (1) requiring higher level of skilled labor to be dispatched to determine network problems and (2) requiring those technicians to spend time reviewing and analyzing the signal characteristics in detail to determine if they meet the required specifications (center frequency, Optical Signal to Noise Ratio, channel power, channel crosstalk [also known as adjacent channel power], etc.)

, etc).

Existing solutions allow a user to take measurements on WDM systems and provides the signal level and characteristics across the complete spectrum. Existing solutions can provide measurement of given characteristics on that signal but do not provide the user a quick and simple understanding of whether an issue exists, which may impact overall reliability.

Using existing solutions, a user would be required to carry out calculations on their own to determine if the channel will operate without potential problems. Typically, the user would review a Channel Power and a Center Frequency/Center Wavelength/Channel Number independently and pass or fail a network based on one or the other independently. Identifying a characteristic independently may indicate a good channel as bad or a bad channel as good.

SUMMARY

Exemplary implementations of the present invention address at least the above problems and/or disadvantages and other disadvantages not described above. Also, the present invention is not required to overcome the disadvantages described above, and an exemplary implementation of the present invention may not overcome any of the problems listed above.

One embodiment of the present invention utilizes a method of measuring characteristics of a WDM system including obtaining channel characteristics of a channel, calculating a Health Factor of a channel using the characteristics, and displaying the Health Factor and characteristics of a channel on a display device.

Other features of the embodiment may include calculating the Health Factor of the channel by calculating a health of the channel, and comparing the health of the channel to a threshold.

Other features of the embodiment may include the channel characteristics being an OSNR, a channel power, and a center frequency of the channel of the WDM system. Other features of the embodiment may include the channel characteristics further being an Adjacent Channel Power factor, data rate, modulation type, and forward error correction type.

Other features of the embodiment may include the threshold being a Fail Threshold and a Marginal Threshold. Other features of the embodiment may include the Health Factor being indicated by either a "Failing Health," "Marginal Health," or a "Passing Health," depending on the result of the comparison of the health to the Fail Threshold and the Marginal Threshold.

Other features of the embodiment may include the characteristics, which are displayed on the display device, including the OSNR, the channel power, the center frequency, a number of channels analyzed, a channel spacing, a TAP, a total power, and a number of channels that are unhealthy.

Other features of the embodiment may include the display device obtaining channel characteristics of a channel, calculating a health of a channel, and comparing the health of the channel to a threshold to determine a Health Factor of the channel.

Another embodiment of the invention may include an apparatus which measures characteristics of a WDM system including an input port which obtains channel characteristics, a processor which calculates a Health Factor of a channel using the characteristics; and a display which displays the Health Factor and characteristics.

Other features of the embodiment may include the processor calculating the Health Factor of a channel by calculating a health of the channel, and comparing the health of the channel to a threshold.

Other features of the embodiment may include the channel characteristics being an OSNR, a channel power, and a center frequency of the channel of the WDM system. Other features of the embodiment may include the channel characteristics further being an Adjacent Channel Power factor, data rate, modulation type, and forward error correction type.

Other features of the embodiment may include the threshold being a Fail Threshold and a Marginal Threshold. Other features of the embodiment may include the Health Factor being one of either a "Failing Health," "Marginal Health," or a "Passing Health," depending on the result of the comparison of the health to the Fail Threshold and the Marginal Threshold.

Other features of the embodiment may include the characteristics, which are displayed on the display, being the OSNR, the channel power, the center frequency, a number of channels analyzed, a channel spacing, a TAP, a total power, and a number of channels that are unhealthy.

Another embodiment of the invention may include a computer readable medium storing a program which causes a processor to measure characteristics of a WDM system including obtaining channel characteristics of a channel, calculating a Health Factor of a channel using the characteristics; and displaying the Health Factor and characteristics of a channel on a display device.

Another embodiment of the invention may include calculating the Health Factor of a channel by calculating a health of the channel, and comparing the health of the channel to a threshold.

Another embodiment of the invention may include the channel characteristics being an OSNR, a channel power, and a center frequency of the channel of the WDM system. Another embodiment of the invention may include the channel characteristics further being an Adjacent Channel Power factor, data rate, modulation type, and forward error correction type.

Another embodiment of the invention may include the threshold being a Fail Threshold and a Marginal Threshold. Another embodiment of the invention may include the Health Factor being one of either a "Failing Health," "Marginal Health," or a "Passing Health" depending on the result of the comparison of the health to the Fail Threshold and the Marginal Threshold.

Another embodiment of the invention may include the characteristics, which are displayed on the display, being the OSNR, the channel power, the center frequency, a number of channels analyzed, a channel spacing, a TAP, a total power, and a number of channels that are unhealthy.

BRIEF DESCRIPTION OF THE DRAWING

FIG. 2A shows a first part of an exemplary embodiment of possible combinations of analyzing characteristics for determining the health of a system.

FIG. 2B shows a second part of an exemplary embodiment of possible combinations of analyzing characteristics for determining the health of a system.

FIG. 9 is an exemplary embodiment of a Channel Display Options 50 which shows information 80 of a device.

DETAILED DESCRIPTION

The following detailed description is provided to assist the reader in gaining a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

In an exemplary embodiment, benefits and advantages of the invention include, but are not limited to the following. This solution helps the carriers by (1) enabling less skilled technicians to be dispatched for service calls as the Health Meter quickly makes a less skilled user equivalent to more expensive and highly trained counterparts and (2) decreases test time as a user is given a timely view of "health" across the entire band for all channels instantly without any need to perform a channel-by-channel analysis or review channel-by-channel tabular data as in competitive systems.

Figure 1:
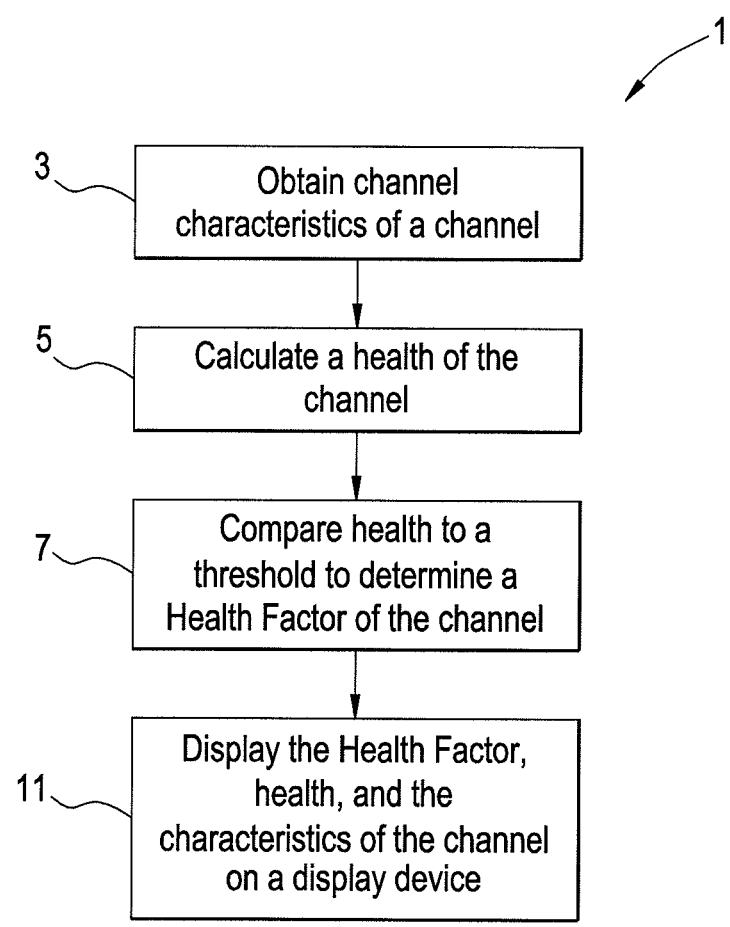
FIG. 1 is an exemplary embodiment of a flowchart 1 of a general process of assessing the health of a channel.

Referring to the drawings, FIG. 1 is a flowchart 1 of the general process of assessing the health of a channel. In an exemplary embodiment, the first step 3 is to obtain channel characteristics of a channel. In an exemplary embodiment, the channel characteristics may include optical signal to noise ratio (OSNR), Channel Power, Center Frequency, etc.

In an exemplary embodiment, the second step 5 is to use a device to calculate a health of the channel using an equation and the obtained channel characteristics. In an exemplary embodiment, the equation is a Health Equation, which combines characteristics of a channel together and factors in interactions between the characteristics, as well as the design parameters of networks, to determine a level of "health" for the channel.

For example, Channel Power and Center Frequency alone are not sufficient to decide if a channel will have a problem reliably transmitting data. When a channel has a Center Frequency that has shifted from what is expected by a Receiver (i.e. shifted from the defined ITU grid), the characteristics of the channel may not be correctly received by the Receiver. However, if a power level of the channel is high enough, then there is a greater probability of the Receiver correctly receiving the signal without issue.

In an exemplary embodiment, the Health Equation takes into account Channel Power, Center Frequency, Center Frequency Shift, Optical Signal to Noise Ratio and adjacent channel relationships, and evaluates these based on standard receiver input filter characteristics to determine if a given channel will operate without potential problems.

In an exemplary embodiment, the Health Equation may take into account an Adjacent Channel Power factor of the channel. In an exemplary embodiment, if the optical power in a channel is significantly greater than its adjacent channel(s), it will affect the performance of the lower power channels. In an exemplary embodiment, a user will use this characteristic to adjust the gain flatness of the WDM system.

In an exemplary embodiment, the Health equation may take into account a data rate, modulation type and forward error correction type of the channel. In an exemplary embodiment, these parameters determine channel health by associating a bit error rate to an OSNR of the channel. In an exemplary embodiment, users can select WDM equipment type and threshold settings based on data supplied by WDM Optical Network Equipment.

In a first exemplary embodiment, a health of the channel is determined by the following equation:

$$\text{Health}=f(\text{OSNR})*k_{OSNR}\&\&f(\text{ChannelPower,CenterFreq})*k_{chPwr}\&\&f(\text{CenterFrequency})*k_{freq}$$

wherein f(OSNR) is the function of the OSNR, and $k_{OSNR}$ is the weighting content number of the OSNR, wherein f(ChannelPower, CenterFreq) is the function of the channel power and center frequency, and $k_{chPwr}$ is the weighting content number of the channel power and center frequency, wherein f(CenterFrequency) is the function of the center frequency, and $k_{freq}$ is the weighting content number of the center frequency.

In a second exemplary embodiment, a health of a channel may be determined by the following method, which utilizes an OSNR, Channel Power, and Center Frequency Shift of a channel. In an exemplary embodiment, the OSNR of a channel is compared to an OSNR marginal threshold and an OSNR fail threshold. In an exemplary embodiment, if the OSNR is less than the fail threshold, then an OSNRHealth is assigned a failing value. In an exemplary embodiment, if the OSNR is less than the an OSNR marginal threshold, then the OSNRHealth is assigned a marginal value. In an exemplary embodiment, if the OSNR is greater than or equal to the OSNR marginal threshold, then the OSNRHealth is assigned a passing value. In an exemplary embodiment, an OSNR marginal threshold is 20 dB, an OSNR Fail Threshold is 18 dB, a failing value is 33, a marginal value is 50 and a passing value is 100.

In an exemplary embodiment, the Channel Power of a channel is compared to an Power marginal threshold and an Power fail threshold. In an exemplary embodiment, if the Channel Power minus a Frequency Shift Loss of the channel is less than the Power fail threshold, then a PowerHealth is determined to be a failing value. In an exemplary embodiment, if the Channel Power minus a Frequency Shift Loss of the channel is less than the Power marginal threshold, then a PowerHealth is determined to be a marginal value. In an exemplary embodiment, if the Channel Power minus a Frequency Shift Loss of the channel is greater than or equal to the Power marginal threshold, then PowerHealth is determined to be a passing value. In an exemplary embodiment, a Power marginal threshold is −22 dBm, and a Power Fail Threshold is −25 dBm.

In an exemplary embodiment, the Center Frequency Shift of a channel is compared to an Frequency marginal threshold and an Frequency fail threshold. In an exemplary embodiment, if the Center Frequency Shift of the channel is greater than the Frequency fail threshold, then a FreqHealth is determined to be a failing value. In an exemplary embodiment, if the Center Frequency Shift of the channel is greater than the Frequency marginal threshold, then a FreqHealth is determined to be a marginal value. In an exemplary embodiment, if the Center Frequency Shift of the channel is less than or equal to the Frequency marginal threshold, then FreqHealth is determined to be a passing value. In an exemplary embodiment, a Frequency marginal threshold is 0.12625 nm or 15.5 GHz, and a Frequency Shift Fail Threshold is 0.19375 nm or 23.5 GHz.

In an exemplary embodiment, using the OSNRHealth, PowerHealth, and FreqHealth, a health may be determined by the following equation:

$$\text{Health}=\text{FreqHealth}*\text{FreqHealthWeighting}+\text{PowerHealth}*\text{PowerHealthWeighting}+\text{OSNRHealth}*\text{OSNRHealthWeighting}.$$

In an exemplary embodiment, the FreqHealthWeighting is 0.30, the PowerHealthWeighting is 0.30, and the OSNRHealthWeighting is 0.40.

In an exemplary embodiment, each of the OSNR, Channel Power, and Center Frequency Shift may be compared to a threshold corresponding to each characteristic for determining a health of the channel. In an exemplary embodiment, if the OSNR is greater than or equal to an OSNR Marginal Threshold, the Channel Power is greater than or equal to a power marginal threshold, and the Center Frequency Shift is less than or equal to a Frequency Marginal Threshold, than the Health of the channel is determined to be good. In an exemplary embodiment, if the OSNR is less than an OSNR Fail Threshold, the Channel Power minus the Frequency Shift Loss is less than Power Fail Threshold, or the Center Frequency Shift is less than the Frequency Fail Threshold, then the health of a channel is determined to be bad. In an exemplary embodiment, the Power Fail Threshold is −25 dBm, the Power Marginal Threshold is −22 dB, the OSNR Fail Threshold is 18 dB, the OSNR Marginal Threshold is 20 dB, the Frequency Shift Fail Threshold (¼ of 3 dB bandwidth)=0.19375 nm (23.5 GHz), and the Frequency Shift Marginal Threshold (½ of 1 dB bandwidth)=0.12625 nm (15.5 GHz).

FIG. 2 shows an exemplary embodiment of possible combinations of analyzing characteristics for determining the health of a system. In an exemplary embodiment, a good health has a value of 100, and marginal health has a value of 50, and a bad health has a value of 33.

In an exemplary embodiment, the third step 7 is to compare the health to a threshold to determine a Health Factor of the channel. In an exemplary embodiment, a Health Factor is an identification of the health of a channel. In an exemplary embodiment, the Health Equation allows extensibility in what defines "healthiness" of a network by abstracting health through a Health Factor. In an exemplary embodiment, additional components can be added to the Health Equation to provide greater accuracy of the "healthiness" of a channel. For an end user in an exemplary embodiment, the "healthiness" is exposed not as additional components to understand but instead as a single Health Factor allowing them to quickly determine "Good", "Bad", and "Marginal" health.

In an exemplary embodiment, the thresholds are a "Fail Threshold" and a "Marginal Threshold." In an exemplary embodiment, if the Health is a lower value than the Fail Threshold, then the Health Factor of the channel is determined to be a "Failing Health." In an exemplary embodiment, if the Health is a higher value than the Fail Threshold, but a lower value than the Marginal Threshold, then the Health Factor of the channel is determined to be a "Marginal Health." In an exemplary embodiment, if the Health is a higher value than the Marginal Threshold, then the Health Factor of the channel is determined to be a "Passing Health." In an exemplary embodiment, if the Health is a higher value than the Good Threshold, then the Health Factor of the channel is determined to be a "Good Health." In an exemplary embodiment, a good threshold is 100, a marginal threshold is 50, and a failing threshold is 33.

In an exemplary embodiment, the thresholds are a "Pass Threshold" and a "Fail Threshold." In an exemplary embodiment, if the Health is a lower value than the Fail Threshold, then the Health Factor of the channel is determined to be at "0% Health." In an exemplary embodiment, if the Health is a higher value than the Pass Threshold, then the Health Factor of the channel is determined to be at "100% Health." In an exemplary embodiment, if the Health is a higher value than the Fail Threshold, but a lower value than the Marginal Threshold, then the Health Factor of the channel is determined to be at "xx % Health," where the number xx is determined from interpolation.

Figure 3:
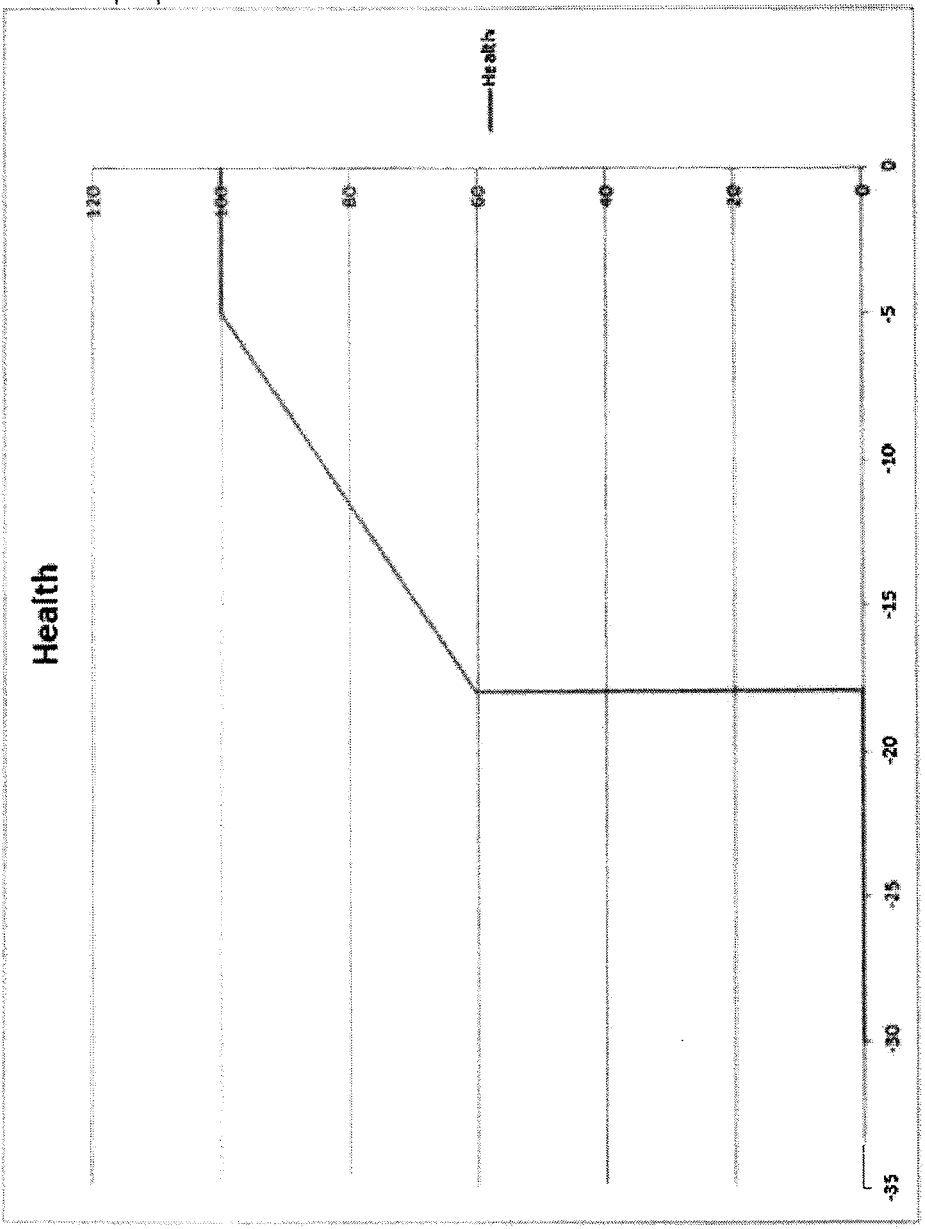
FIG. 3 shows an exemplary embodiment of a chart analyzing the health of a system.

FIG. 3 shows an exemplary embodiment of a chart analyzing the health of a system. In an exemplary embodiment, the vertical axis shows the health, and horizontal axis shows the power in dB. In an exemplary embodiment, the thresholds are a "Pass Threshold" and a "Fail Threshold." In an exemplary embodiment, if the Health is a lower value than the Fail Threshold, then the Health Factor of the channel is determined to be at "0% Health." In an exemplary embodiment, if the Health is a higher value than the Pass Threshold, then the Health Factor of the channel is determined to be at "100% Health." In an exemplary embodiment, if the Health is a higher value than the Fail Threshold, but a lower value than the Marginal Threshold, then the Health Factor of the channel is determined to be at "xx % Health," where the number xx is determined from interpolation. In an exemplary embodiment, the graph shows a health of a channel where the "Fail Threshold" is 60%, and the "Pass Threshold" is 100%.

In an exemplary embodiment, the fourth step 11 is to display the Health Factor of the channel and the characteristics of the channel on a display device. In an exemplary embodiment, the device which calculates the health and a device which compares health to a threshold may also be the same device as the display device. In an exemplary embodiment, the steps of the flowchart 1 may be utilized on any number of channels simultaneously. In an exemplary embodiment, Health Factors and characteristics of any number of channels may be displayed as in the fourth step 11.

Figure 4:
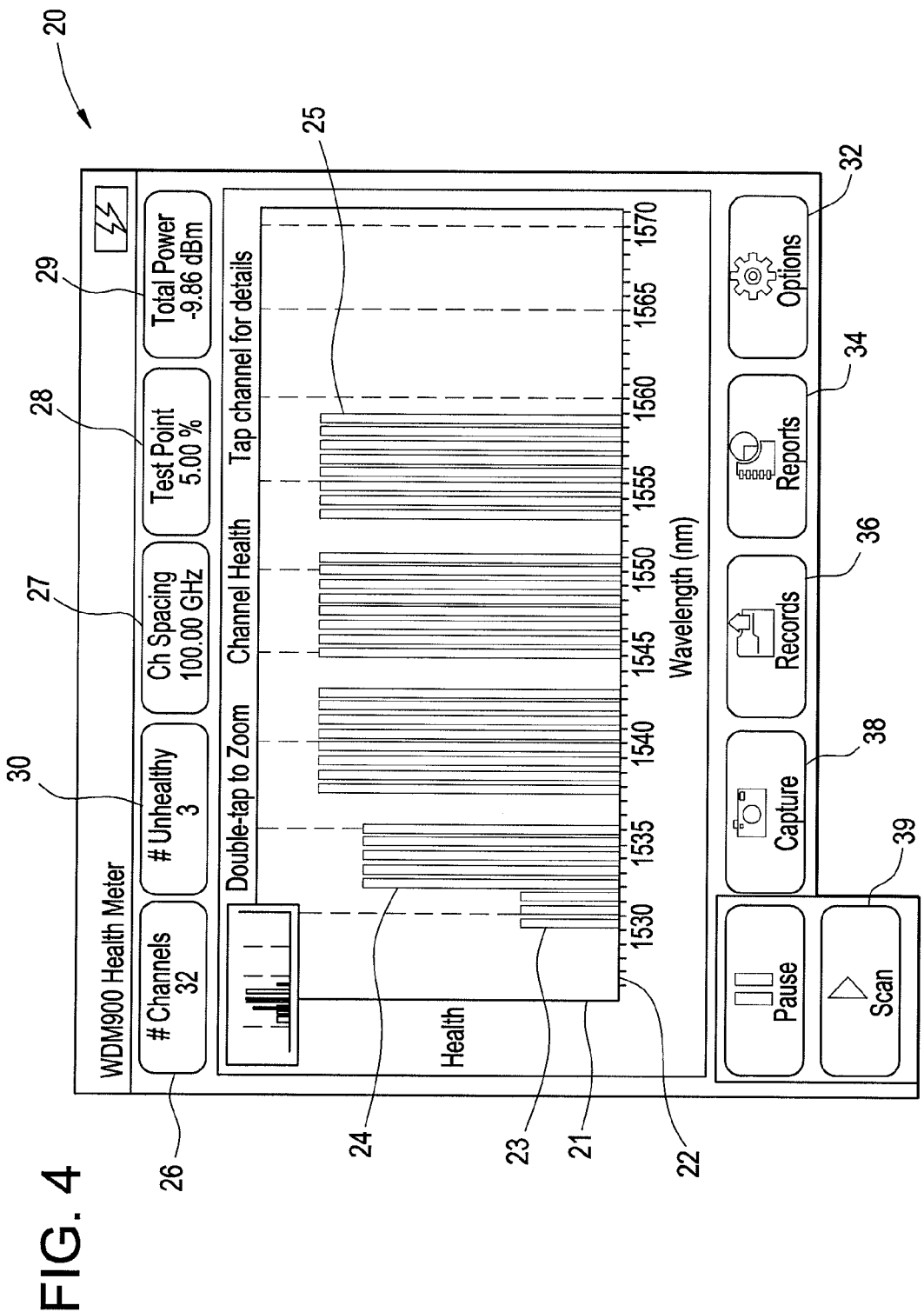
FIG. 4 is an exemplary embodiment of a Channel Health Meter 20 displaying the Channel Health of channels

FIG. 4 is an exemplary embodiment of a Channel Health Meter 20 displaying the Channel Health of channels. An exemplary embodiment of the invention has a Channel Health Meter, which utilizes a method by which a quick statement of "health" is provided on a channel-by-channel basis across an entire band of channels. In an exemplary embodiment, the Channel Health Meter uses a Health Equation, which identifies "Good" Channels, "Bad" Channels, and "Marginal" Channels. In an exemplary embodiment, a number of channels are shown on the display 20. In an exemplary embodiment, the vertical axis 21 shows the health of a channel, and the horizontal axis shows channels in order of their respective wavelengths (in nanometers). In an exemplary embodiment, the horizontal axis may be changed to show the frequency spectrum in Terahertz, or channel numbers corresponding to each channel. In an exemplary embodiment, a channel with a "Failing Health" is distinguishable from a channel with a "Passing Health," or a good channel 25, and a channel with "Marginal Health," or a marginal channel 24. In an exemplary embodiment, failing channels 23 are distinguished by providing a color of the channels that is not the same color as the marginal channels 24 or the good channels 25. In an exemplary embodiment, the failing channel 23 may be further distinguished by providing a number of the channel above the failing channel 23, increasing the width of the failing channels compared to the marginal channels 24 and the good channels 25, or producing arrows where the tips of the arrows point to the failing channels 23.

In an exemplary embodiment, the Channel Health Meter 20 shows other characteristics of the system, including the number of channels 26, the channel spacing 27, the Test Point Power Ratio (TAP) 28, the total power 29 across all of the channels, and the number of unhealthy channels 30. In an exemplary embodiment, the Channel Health Meter 20 may have buttons for interacting with the display. In an exemplary embodiment, the icons may be used to toggle an options menu in the Channel Health Meter 20, generate test reports 34 from previous scans, view records 36 of previous tests performed, capture 38 a picture of the current display, pause and start a scan 39, etc. In an exemplary embodiment, the Channel Health Meter allows a user to examine characteristics of the channel data to see values of each of the discrete components and why their combination generated the resultant Health Factor.

Figure 5:
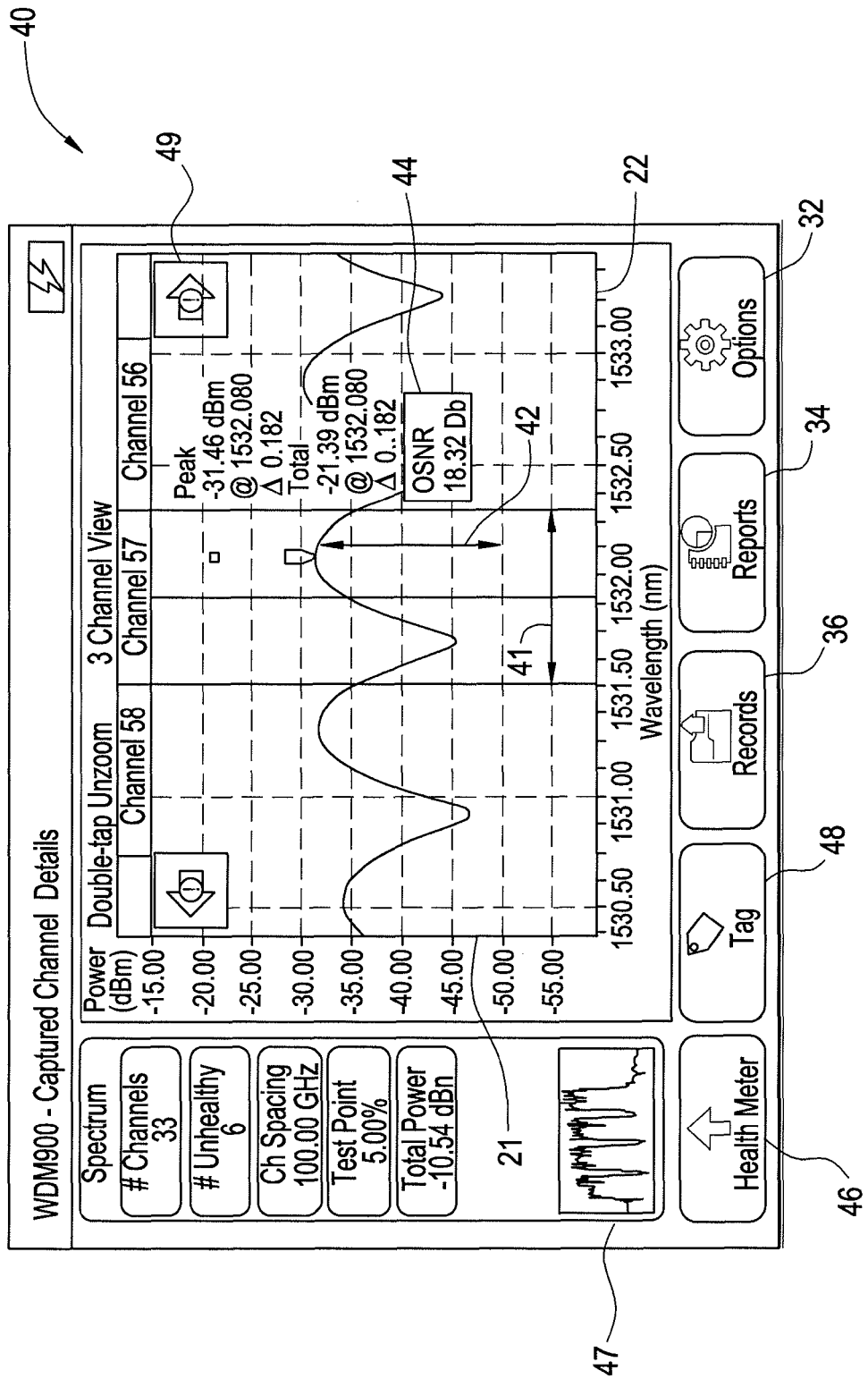
FIG. 5 is an exemplary embodiment of a Channel Health Meter 20 displaying a channel with a "Failing Health."

FIG. 5 is an exemplary embodiment of a Channel Health Details 40 displaying a channel, labeled as "Channel 57," with a "Failing Health." In an exemplary embodiment, the vertical axis 21 of the display shows the power in dBm and the horizontal axis 22 shows the frequency in THz. In an exemplary embodiment, the failing channel 41 is distinguished by presenting the channel with a color that is different from the color of the marginal channels and the passing channels. In an exemplary embodiment, an OSNR indicator 42 shows the range at which the OSNR is being measured, and a resultant OSNR value 44 is shown next to the failing channel. In an exemplary embodiment, other characteristics of the channel may be shown on the display, such as the total power and the peak power of the channel. In an exemplary embodiment, the user may switch between the channels that have "Failing Health" by activating an arrow icon 49.

In an exemplary embodiment, the Channel Health Details 40 may have icons for interacting with the display, including a health meter icon 46, a spectrum thumbnail 47 which provides an indication of where the displayed channel is located in the C-Band, and a TAG icon 48 for entering a TAG sub-menu, where the user may tag the test results with keywords for ease of identification. In an exemplary embodiment, the Channel Health Details 40 shows other characteristics of the system, including the number of channels, the channel spacing, the TAP, the total power across all of the channels, and the number of unhealthy channels.

Figure 6:
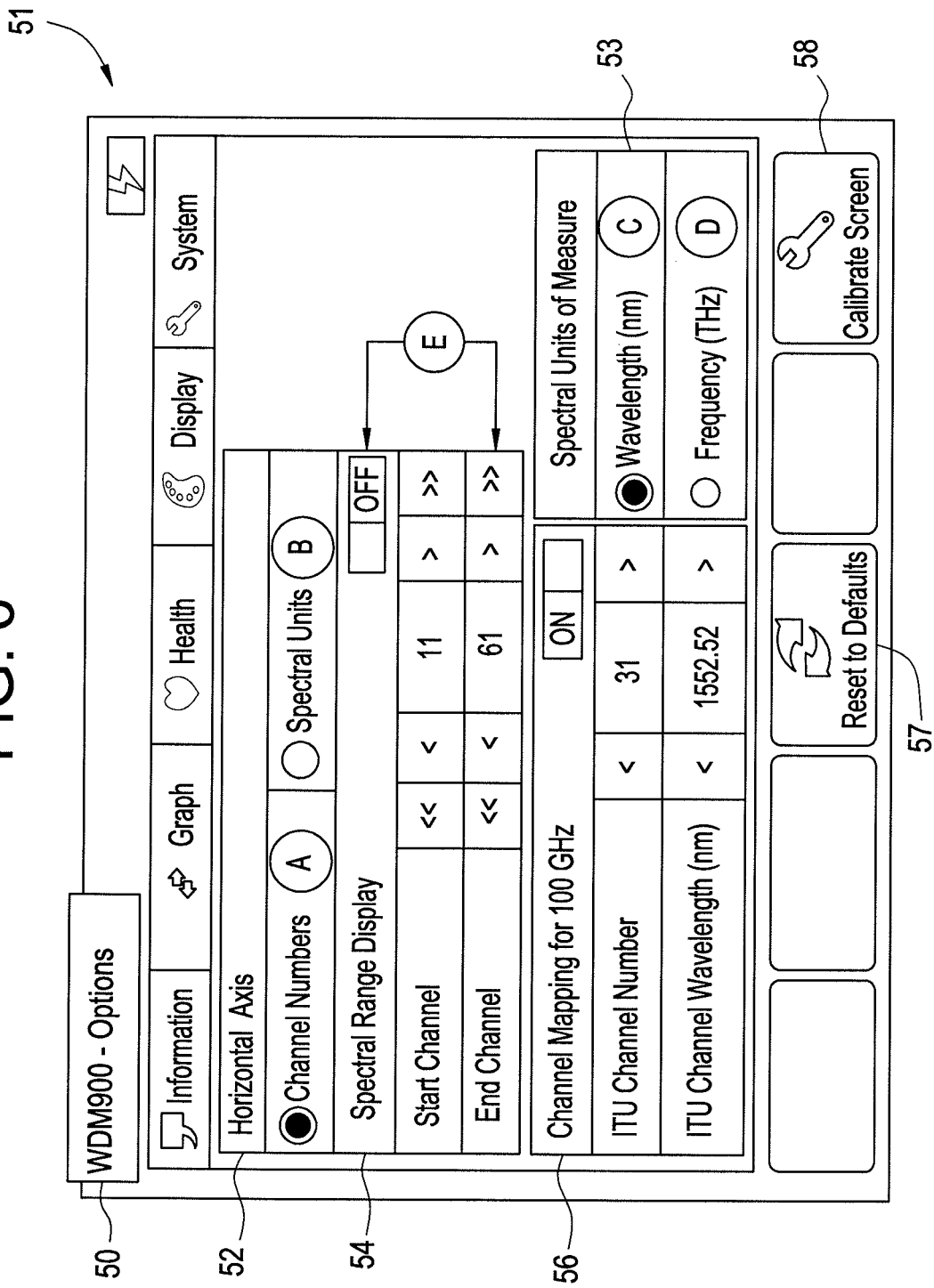
FIG. 6 is an exemplary embodiment of a Channel Health Meter 20 displaying settings of the display.

FIG. 6 is an exemplary embodiment of a Channel Display Options 50 which shows settings of the graph display 51. In an exemplary embodiment, the horizontal axis options 52 allows the user to change the display of the horizontal axis between displaying channel numbers A and displaying spectral units B. In an exemplary embodiment, the spectral units option 53 allows a user to change the displayed spectral units between wavelength C and frequency D.

In an exemplary embodiment, the Spectral Range Display option 54 allows a user to adjust the range on the horizontal axis displayed on the Channel Health Meter 20. In an exemplary embodiment, the change options E allow for a user to change the start channel and end channel, and allow for a user to switch to limiting the horizontal axis in the spectral range, such as wavelength or frequency. In an exemplary embodiment, the channel mapping option 56 allows the user to choose a default ITU channel numbering plan or define a custom channel numbering plan. In an exemplary embodiment, buttons allow a user to reset the options to default options 57 and calibrate the screen 58.

Figure 7:
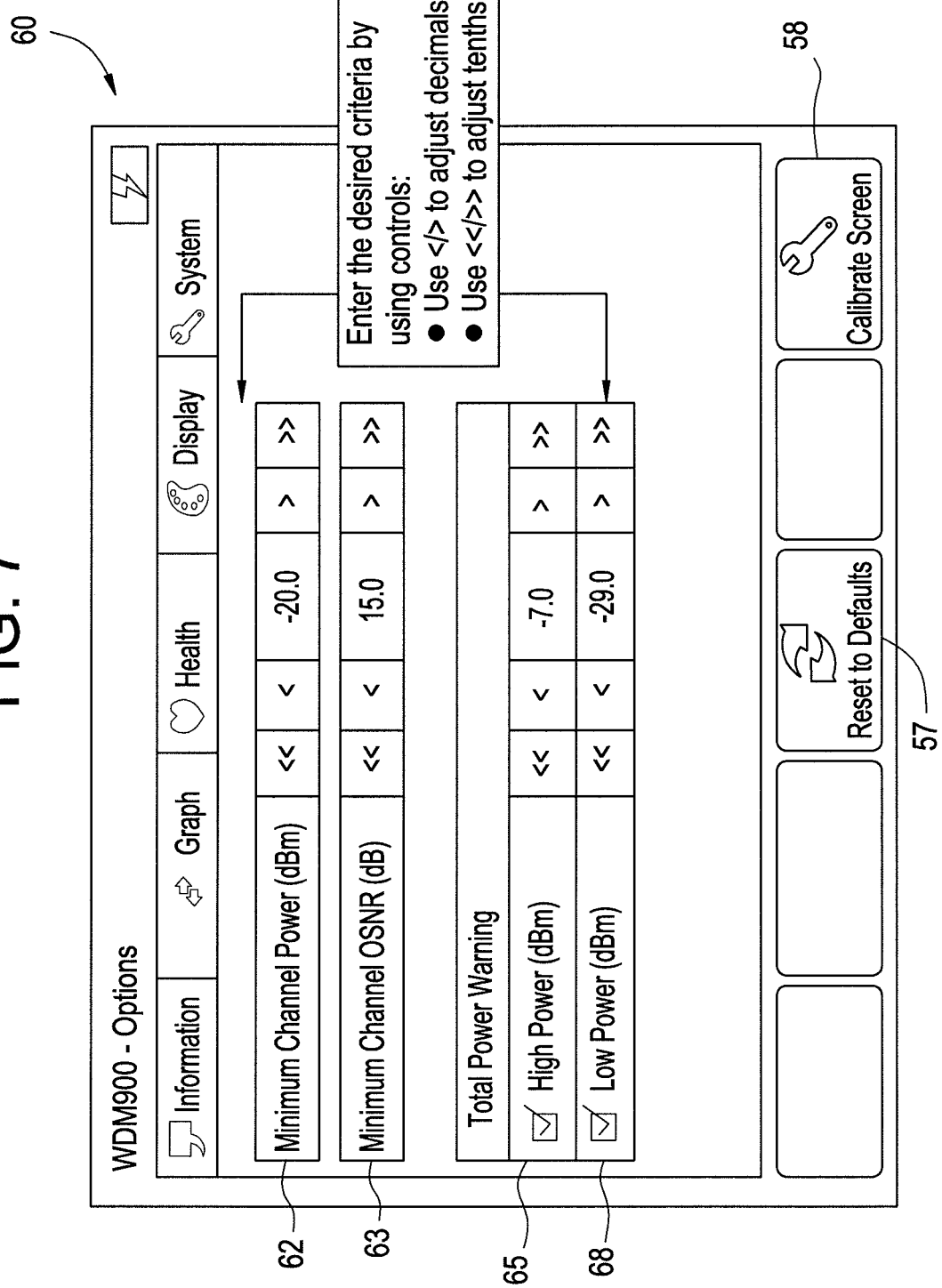
FIG. 7 is an exemplary embodiment of a Channel Display Options 50 which shows settings of the health display 60.

FIG. 7 is an exemplary embodiment of a Channel Display Options 50 which shows settings of the health display 60. In an exemplary embodiment, a minimum channel power option 62 allows a user to set a minimum channel power (in dBm) for determining the health of a channel. In an exemplary embodiment, a minimum channel OSNR option 63 allows a user to set a minimum channel OSNR (in dB) for determining the health of a channel. In an exemplary embodiment, a total power warning option allows a user to set a total minimum high power 65 and a total maximum low power 68 (in dBm) which determines a safe range for the channel to operate.

Figure 8:
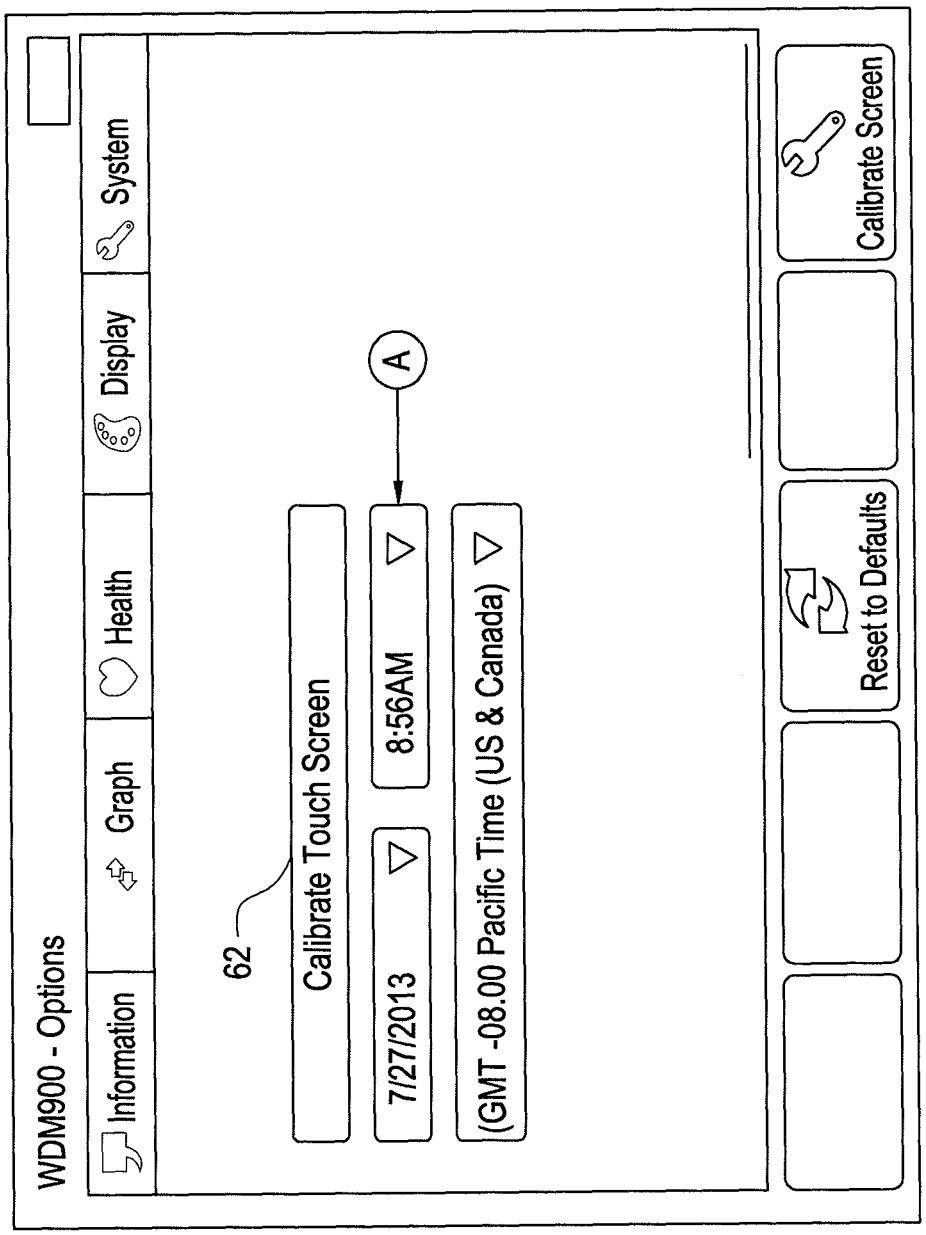
FIG. 8 is an exemplary embodiment of a Channel Display Options 50 which shows settings of the internal system 70.

FIG. 8 is an exemplary embodiment of a Channel Display Options 50 which shows settings of the internal system 70. In an exemplary embodiment, the settings of the internal system comprise a date, a time, and a time zone which may be set by a user. In an exemplary embodiment, an option to calibrate the touch screen 62 is provided so a user may adjust the calibration of a touch screen feature.

FIG. 9 is an exemplary embodiment of a Channel Display Options 50 which shows information 80 of a device. In an exemplary embodiment, the information 80 may comprise a model, serial number, calibration date of the device, operating system version, technical support contact information, etc.

Figure 10:
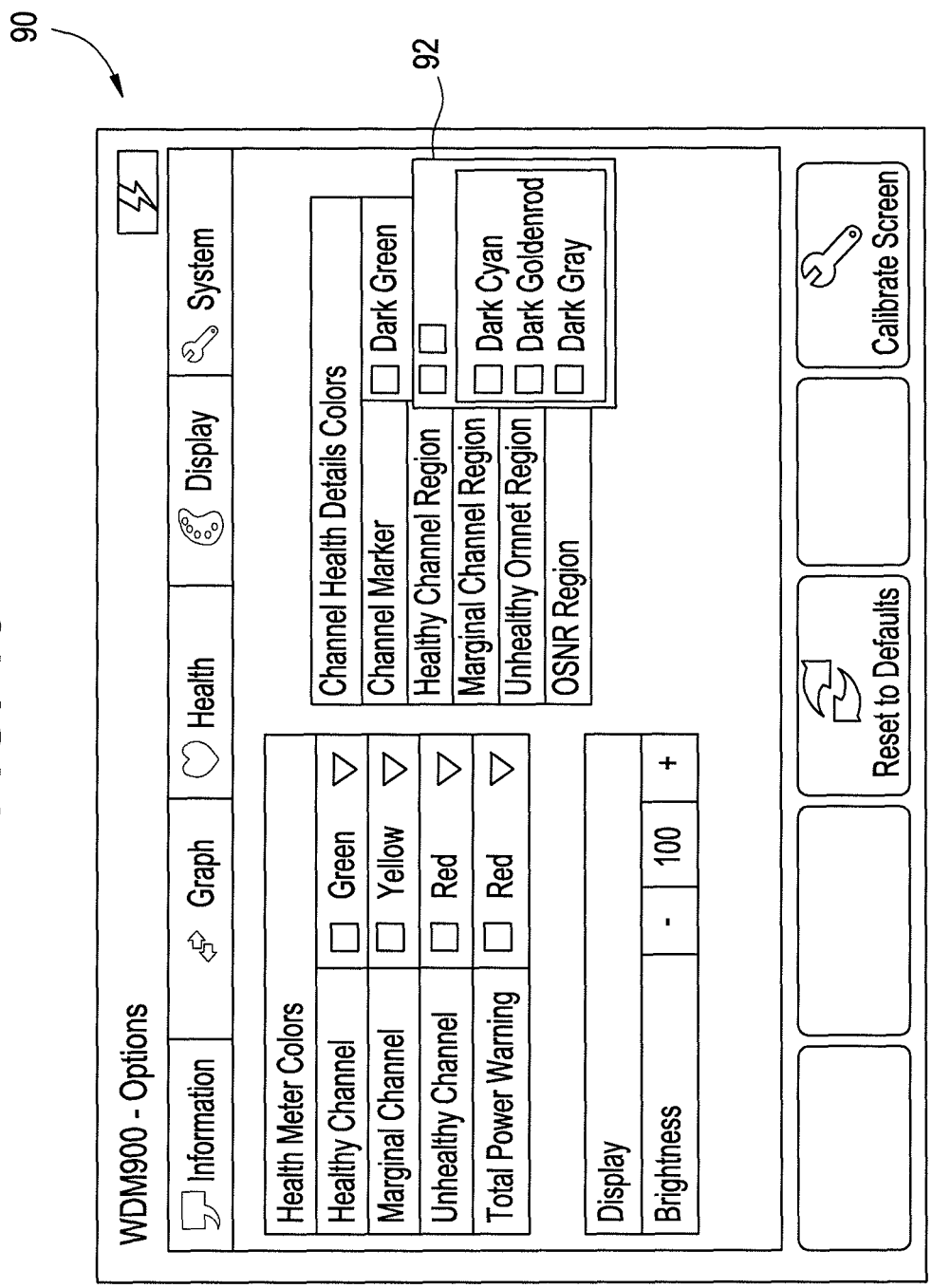
FIG. 10 is an exemplary embodiment of a Channel Display Options 50 which shows display information 90 of a device.

FIG. 10 is an exemplary embodiment of a Channel Display Options 50 which shows display information 90 of a device. In an exemplary embodiment, the display information shows details that allow a user to change a color of a channel or other display (eg. Channel Maker, OSNR region, etc.) displayed in the health display 60. In an exemplary embodiment in FIG. 8, the healthy channel setting is set to "green" and the unhealthy channel setting is set to "red." In an exemplary embodiment, a drop-down menu 92 may be used to select a color of a channel or other display.

Figure 11:
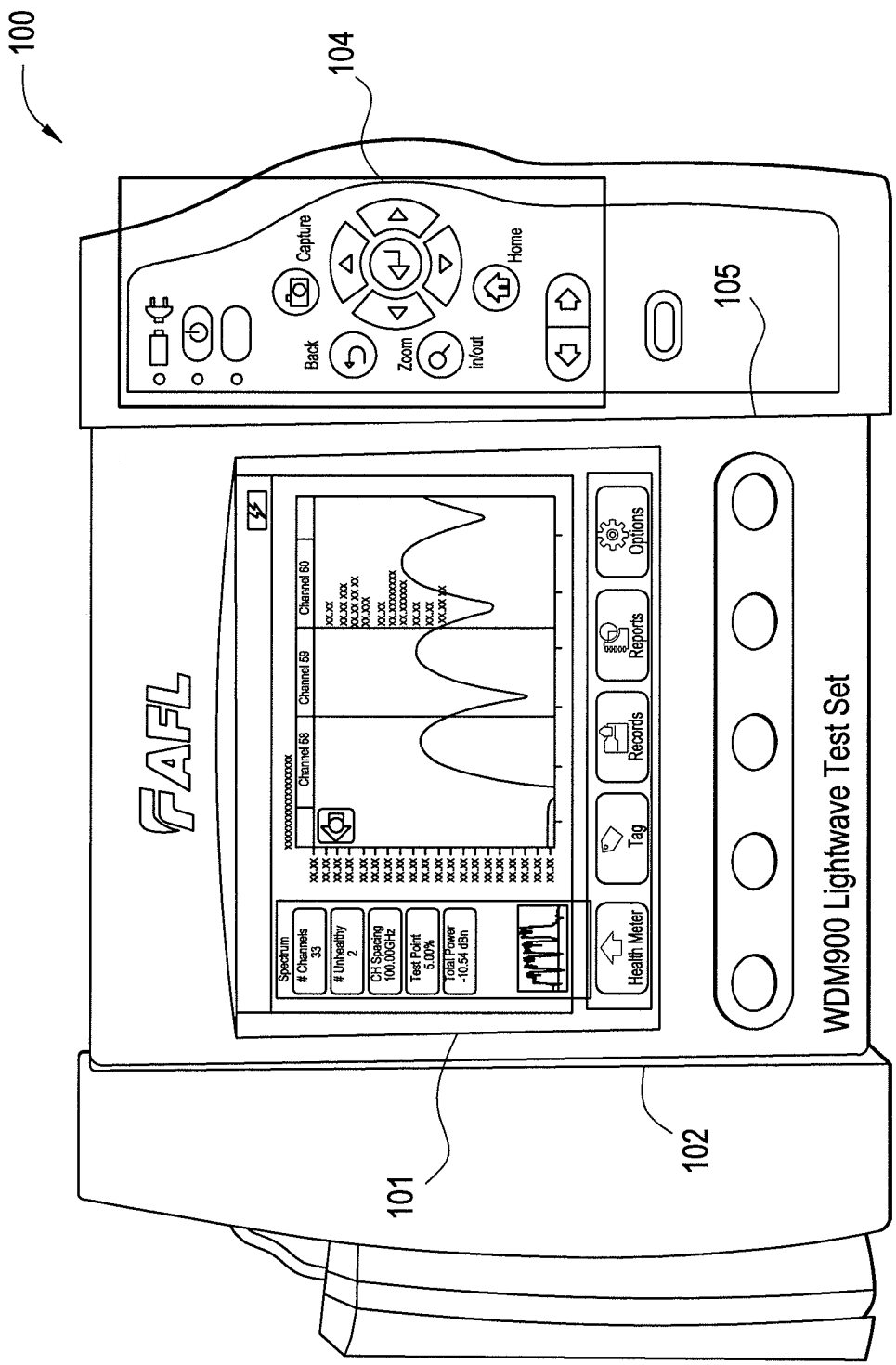
FIG. 11 is an exemplary embodiment of a front view of a display device 100 for displaying the Channel Health of the channel.

FIG. 11 is an exemplary embodiment of a front view of a display device 100 for displaying the Channel Health of the channel. In an exemplary embodiment, the display device 100 is a WDM900 Lightwave Test Set, where the display device acquires the channel characteristics of a channel, calculates a Health and Health Factor, and displays the results of the calculation. In an exemplary embodiment, the display device comprises a display screen 101 which displays the results of the calculation and the icons 102, buttons 104 which allow a user to interact with the display device, and icon buttons 105, which interact with the icons 102 on the screen. In an exemplary embodiment, the buttons 104 may be used to power on and off the display device, zooming into and out of the display on the display screen 101, scrolling horizontally through menus, capturing the image on the display screen 101, and moving a cursor and selecting with a cursor on the display of the display screen 101.

Figure 12:
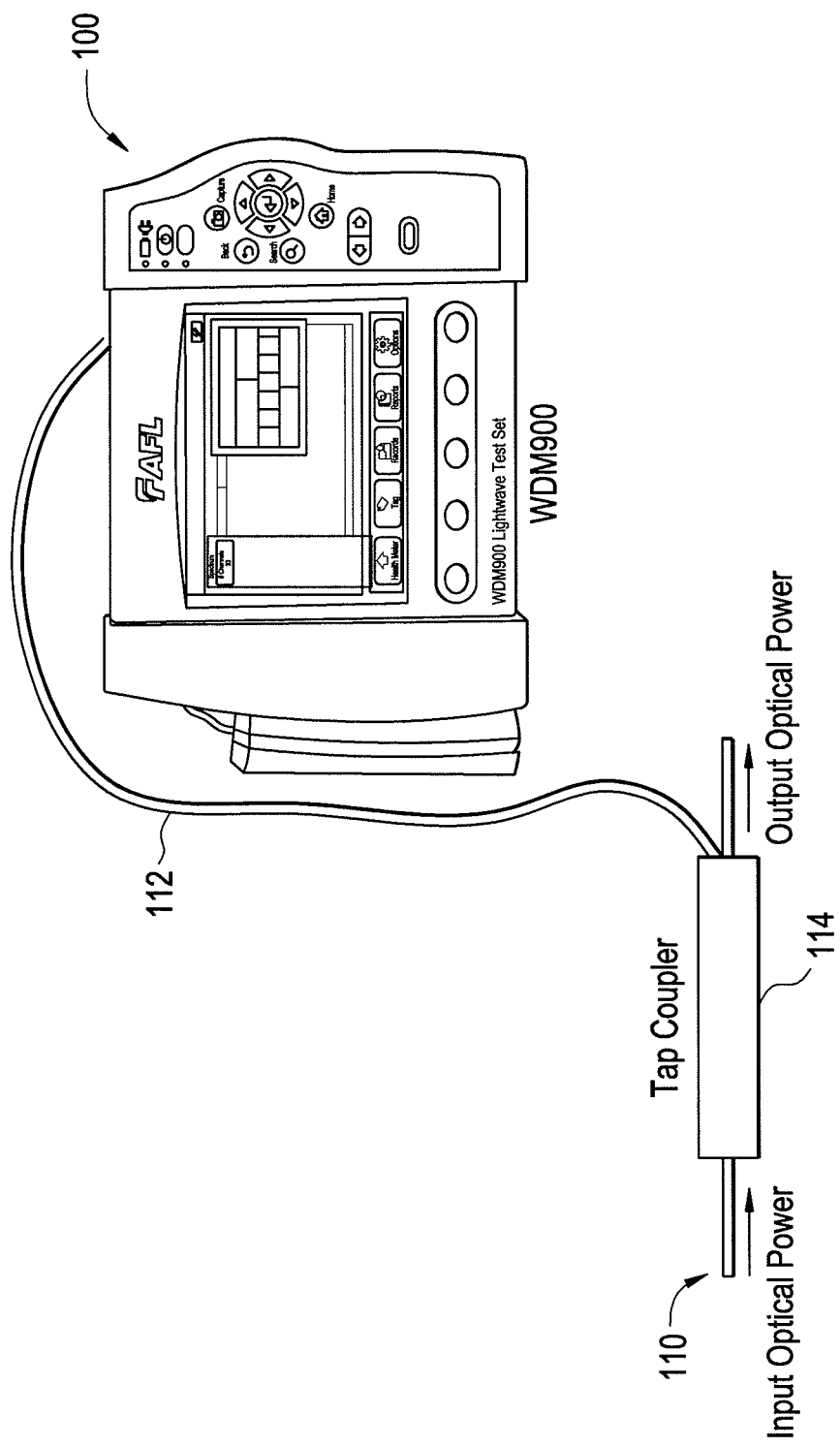
FIG. 12 is an exemplary embodiment of a display device 100 connected to a cable 110 by a connector 112.

FIG. 12 is an exemplary embodiment of a display device 100 connected to a cable 110 by a connector 112. In an exemplary embodiment, the connector 112 connects the display device 100 to a Tap coupler 114 of the cable 110.

Figure 13:
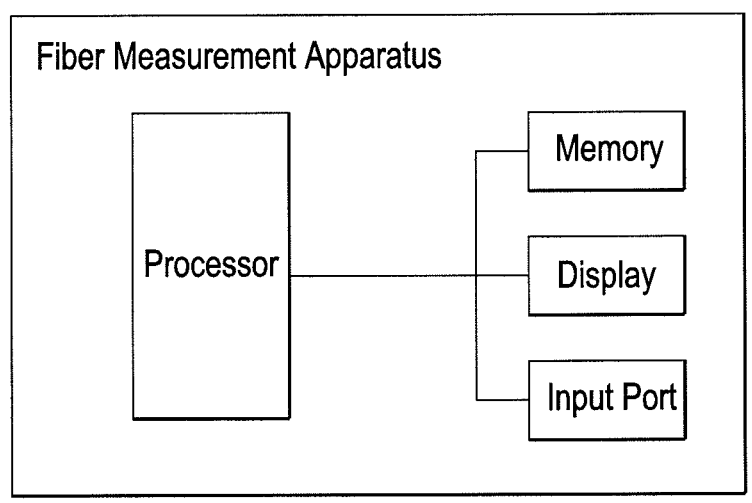
FIG. 13 shows an exemplary functional block diagram of the channel measurement apparatus.

FIG. 13 shows an exemplary functional block diagram of the channel measurement apparatus. It includes a processor, memory, display and input port. An example of a processor is an Marvell ARM PXA320 processor. An example of a memory is a 1 Gbytes of NAND flash memory. An example of a display is a 6.5 inch TFT VGA panel. The processor, under the control of the operating software, controls the operation of the apparatus, including displaying images on the display. The memory stores the operating software and images that are captured on the display. The operating software can also be stored on a non-transitory computer readable medium. In addition, the processor is capable of receiving and analyzing characteristics of a channel via an input port, and producing and outputting reports via an output port (not shown).

Next, exemplary operation of the channel measurement apparatus will be described. The operation assumes the input port is configured with the appropriate connector installed, the touchscreen display is powered up, and the connector is connected to the apparatus.

If testing an optical fiber connector, the connector is slid into the Tap coupler of the optical fiber, using caution not to contaminate the end-face of the connector. An indicator will determine if the connector has been properly connected to the Tap coupler.

Next, the characteristics of the channels of an optical fiber are obtained, sent to the memory, and analyzed by the processor. The processor analyzes the characteristics and determines a health factor of the channel. The health factor and characteristics are sent to the display, and the display shows the characteristics and health factor of the channel As mentioned above, although the exemplary embodiments described above are various apparatuses methods for inspecting channels, they are merely exemplary and the general inventive concept should not be limited thereto, and it could also apply to other types of apparatuses for inspecting optical fibers.

What is claimed is:

1. A computer-implemented method of indicating channel health in a wavelength division multiplexing system, the method comprising:
   determining, by one or more computing devices, an optical signal to noise ratio (OSNR) of a channel of the wavelength division multiplexing system;
   comparing, by the one or more computing devices, the OSNR of the channel to one or more OSNR thresholds to determine an OSNR health of the channel;
   determining, by the one or more computing devices, a channel power minus a frequency shift loss of the channel;
   comparing, by the one or more computing devices, the channel power minus the frequency shift loss to one or more power thresholds to determine a power health of the channel;
   determining, by the one or more computing devices, a center frequency shift of the channel;
   comparing, by the one or more computing devices, the center frequency shift of the channel to one or more frequency thresholds to determine a frequency health of the channel;
   determining, by the one or more computing devices, a health of the channel based at least in part on the OSNR health, the power health, and the frequency health, the health of the channel being a single indication of the overall healthiness of the channel; and
   displaying, by the one or more computing devices, the health of the channel on a display device.

2. The method of claim 1, wherein determining, by the one or more computing devices, the health of the channel based at least in part on the OSNR health, the power health, and the frequency health comprises:
accessing, by the one or more computing devices, a table that contains logical relationships defined between the OSNR health, the power health, the frequency health, and health of the channel; and
using, by the one or more computing devices, the table to determine the health of the channel based at least in part on the OSNR health, the power health, and the frequency health.

3. The method of claim 1, wherein determining, by the one or or computing devices, the health of the channel based at least in part on the OSNR health, the power health, and the frequency health comprises determining, by the one or more computing devices, the health of the channel based at least in part on the OSNR health, the power health, and the frequency health and further based at least in part on an Adjacent Channel Power factor, a data rate, a modulation type, and a forward error correction type.

4. The method of claim 2, wherein the health of the channel comprises a textual description of the overall healthiness of the channel, the textual description comprising one of a "Failing Health," a "Marginal Health," and a "Passing Health".

5. The method of claim 1, further comprising displaying, by the one or more computing devices, on the display device the OSNR, the channel power, a center frequency, a number of channels analyzed, a channel spacing, a TAP, a total power, and a number of channels that are unhealthy.

6. The method of claim 1, wherein the one or more computing devices consist of the display device.

7. An apparatus which displays indications of channel health in a wavelength division multiplexing system, the apparatus comprising:
an input port configured to obtain channel characteristics of a channel of the wavelength division multiplexing system;
a processor configured to:
determine an optical signal to noise ratio (OSNR) of the channel;
input the OSNR of the channel into a OSNR function to determine an OSNR health of the channel;
determine a channel power and a center frequency of the channel;
input the channel power and the center frequency into a channel power function to determine a power health of the channel;
input the center frequency of the channel into a frequency function to determine a frequency health of the channel; and
determine a health of the channel based at least in part on the OSNR health, the popwer health, and the frequency health, the health of the channel being a single indication of the overall healthiness of the channel; and
a display configured to display the health of the channel and the characteristics of the channel.

8. The apparatus of claim 7, wherein to determine the health of the channel based at least in part on the OSNR health, the power health, and the frequency health, the processor is configured to:
access a table that contains logical relationships defined between the OSNR health, the power health, the frequency health, and the health of the channel; and
use the table to determine the health of the channel based at least in part on the OSNR health, the power health, and the frequency health.

9. The apparatus of claim 7, wherein the channel characteristics further comprise an Adjacent Channel Power factor, a data rate, a modulation type, and a forward error correction type and wherein the processor is further configured to determine the health of the channel based at least in part on at least one of the Adjacent Channel Power factor, the data rate, the modulation type, and the forward error correction type.

10. The apparatus of claim 7, wherein:
the health of the channel comprises a numerical health value;
the processor is further configured to compare the numerical health value to one or more thresholds to determine a Health Factor for the channel, wherein the one or more thresholds comprise one or more of a Fail Threshold and a Marginal Threshold; and
to display the health of the channel, the display is configured to display the Health Factor of the channel.

11. The apparatus of claim 10, wherein the Health Factor is comprises one of a "Failing Health," a "Marginal Health," and a "Passing Health" depending on a result of the comparison of the numerical health value to the one or more of the Fail Threshold and the Marginal Threshold.

12. The apparatus of claim 7, wherein the characteristics displayed on the display comprise the OSNR, the channel power, the center frequency, a number of channels analyzed, a channel spacing, a TAP, a total power, and a number of channels that are unhealthy.

13. A non-transitory computer readable medium storing a program that, when executed by one or more processors, cause the one or more processors to:
determine an optical signal to noise ratio (OSNR) of a channel of a wavelength division multiplexing system;
compare the OSNR of the channel to one or more OSNR thresholds to determine an OSNR health of the channel;
determine a channel power minus a frequency shift loss of the channel;
compare a channel power minus a frequency shift loss to one or more power thresholds to determine a power health of the channel;
determine a center frequency shift of the channel;
compare the center frequency shift of the channel to one or more frequency thresholds to determine a frequency health of the channel;
access a table that contains logical relationships defined between the OSNR health, the power health, the frequency health, and a health of the channel;
use the table to determine the health of the channel based at least in part on the OSNR health, the power health, and the frequency health; and
cause display of the health of the channel.

14. The non-transitory computer readable medium of claim 13, wherein execution of the instructions further causes the one or more processors to display channel characteristics that comprise the OSNR, the channel power, and a center frequency of the channel of the wavelength division multiplexing system.

15. The non-transitory computer readable medium of claim 14, wherein execution of the instructions further causes the one or more processor to display further characteristics that further comprise an Adjacent Channel Power factor, a data rate, a modulation type, and an forward error correction type.

16. The non-transitory computer readable medium of claim 13, wherein:

the one or more OSNR thresholds comprise a failing OSNR threshold and a marginal OSNR threshold such that the OSNR health is determined to be one of failing, marginal or passing;

the one or more power thresholds comprise a failing power threshold and a marginal power threshold such that the power health is determined to be one of failing, marginal or passing; and the one or more frequency thresholds comprise a failing frequency threshold and a marginal frequency threshold such that the frequency health is determined to be one of failing, marginal or passing.

17. The non-transitory computer readable medium of claim 13, wherein the health of the channel is indicated by one of a "Failing Health," a "Marginal Health," and a "Passing Health" depending on the logical relationship between the OSNR health, the power health, and the frequency health.

18. The non-transitory computer readable medium of claim 13, wherein execution of the instructions further causes the one or more processors to display the OSNR, the channel power, the center frequency, a number of channels analyzed, a channel spacing, a TAP, a total power, and a number of channels that are unhealthy.

19. The method of claim 1, further comprising:
determining, by the one or more computing devices, the health of each of a plurality of channels of the wavelength division multiplexing system by performing the method of claim 1 for each of the plurality of channels;
wherein displaying, by the one or more computing devices, the health of the channel on the display device comprises causing, by the one or more computing devices, the display device to display a graphical representation that depicts the health of the plurality of channels on a channel-by-channel basis, wherein the horizontal axis of the graphical representation shows the plurality of channels in order of respective wavelengths, respective frequencies, or respective channel numbers, and wherein the vertical axis of the graphical representation shows the health of each respective channel.

20. The method of claim 19, wherein causing, by the one or more computing devices, the display device to display the graphical representation causes causing, by the one or more computing devices, the display device to display the graphical representation that indicates that the respective health of one or more of the plurality of channels is considered to be failing by at least one of:
displaying channels that are considered to be failing in a first color while displaying channels that are not considered to be failing in a second color that is different than the first color;
displaying the corresponding channel number of each channel that is considered to be failing;
displaying channels that are considered to be failing in a first width while displaying channels that are not considered to be failing in a second width that is less than the first width; and
displaying a respective arrow above each channel that is considered to be failing.

21. The method of claim 20, further comprising:
receiving, by the one or more computing devices, a user input that selects one of the channels that are considered to be failing; and
in response to the user input, causing, by the one or more computing devices, the display device to display additional information regarding the user-selected channel.

22. The method of claim 19, further comprising:
providing, by the one or more computing devices, an interactive menu that enables a user to adjust at least one of a range and a unit of the horizontal axis of the graphical representation.

* * * * *